United States Patent [19]

Fredriksson

[11] Patent Number: 4,841,450

[45] Date of Patent: Jun. 20, 1989

[54] ARRANGEMENT COMPRISING A SYSTEM PROVIDING MOVEMENT, PROCESSING AND/OR PRODUCTION

[75] Inventor: Lars-Berno Fredriksson, Kinna, Sweden

[73] Assignee: Kvaser Consultant, AB, Kinna, Sweden

[21] Appl. No.: 183,126

[22] Filed: Apr. 19, 1988

Related U.S. Application Data

[63] Continuation of Ser. No. 731,626, May 1, 1985, abandoned.

[30] Foreign Application Priority Data

Sep. 2, 1983 [SE] Sweden .................. 8304743

[51] Int. Cl.⁴ .............................. G05B 19/18
[52] U.S. Cl. .......................... 364/468; 364/133; 364/513
[58] Field of Search .................. 364/131–136, 364/200, 900, 468, 513

[56] References Cited

U.S. PATENT DOCUMENTS

| | | | |
|---|---|---|---|
| 4,123,794 | 10/1978 | Matsumoto ................ | 364/101 |
| 4,144,550 | 3/1979 | Donohue et al. ........... | 364/107 |
| 4,347,564 | 8/1982 | Sugano et al. ............. | 364/132 |
| 4,425,628 | 1/1984 | Bedard et al. ............. | 364/900 |
| 4,442,502 | 4/1984 | Friend ...................... | 364/900 |
| 4,467,436 | 8/1984 | Chance ..................... | 364/200 |
| 4,580,207 | 4/1986 | Arai et al. ................. | 364/138 |

FOREIGN PATENT DOCUMENTS

| | | | |
|---|---|---|---|
| 19291 | 3/1984 | Australia .................. | 364/474 |
| 0051849 | 5/1982 | European Pat. Off. . | |
| 0100684 | 2/1984 | European Pat. Off. . | |
| 0109287 | 5/1984 | European Pat. Off. . | |
| 0109734 | 5/1984 | European Pat. Off. . | |
| 3145894 | 5/1983 | Fed. Rep. of Germany ...... | 364/474 |
| 1510462 | 5/1978 | United Kingdom . | |
| 2046476 | 1/1980 | United Kingdom . | |
| 2094024 | 9/1982 | United Kingdom . | |
| 2113053 | 7/1983 | United Kingdom . | |

OTHER PUBLICATIONS

Translation of Hopper et al.
PCT Application PCT/US82/01487, filed Oct. 21, 1982, Chance; Applicant: United States Robots, Inc.

Primary Examiner—Allen Macdonald
Attorney, Agent, or Firm—Pollock, Vande Sande & Priddy

[57] ABSTRACT

In a system for the performance of a plurality of functions, each of the functions is allocated its own function control member comprising a microprocessor with the associated peripheral equipment, and one or more actuating devices. Each control member is capable of providing the control for functions of two or more types, and the different control members are mutually interchangeable. The control members are connected in one or more first wiring loops, each of which is connected to a main computer. The signal transmission in the first loop is performed digitally and in series. The transmission of the signals includes first signals emanating from a basic or operative program in the main computer, said first signals are transmitted during a start-up phase for the system and comprising for each control member information in respect of its adjustment in relation to a function control which is applicable to the type of function and/or the variation in the type of function effected by the control member during an operating phase which follows the start-up phase. The signal transmission also includes second signals emanating from a user program entered in the main computer, which second signals are transmitted in a cyclical fashion and which contain continuous information for each microprocessor relating to the manner in which the function served by the microprocessor is to be controlled. The actuating means are supplied with energy via one or more second wiring loops, each of which is connected to an energy source.

11 Claims, 5 Drawing Sheets

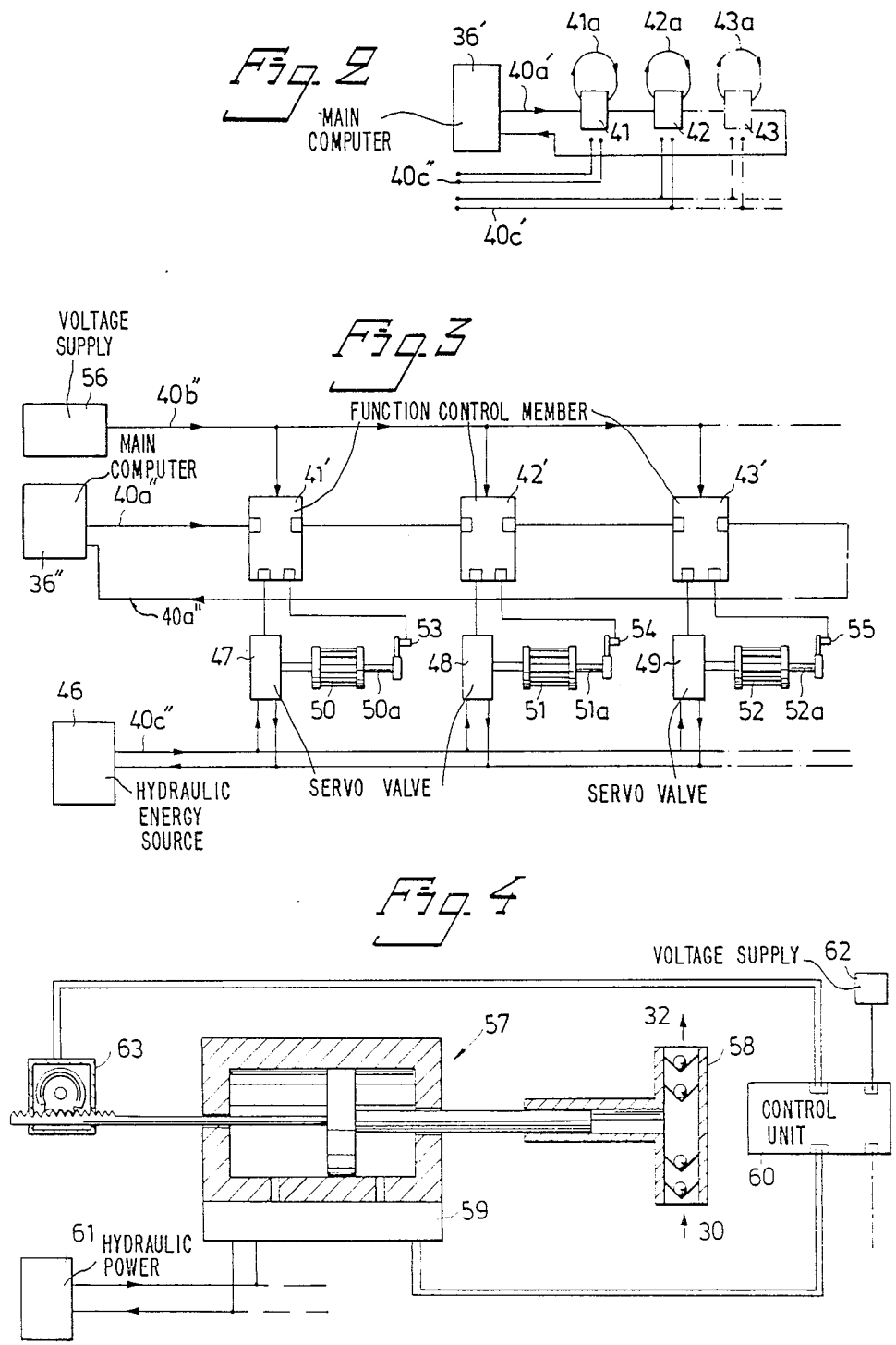

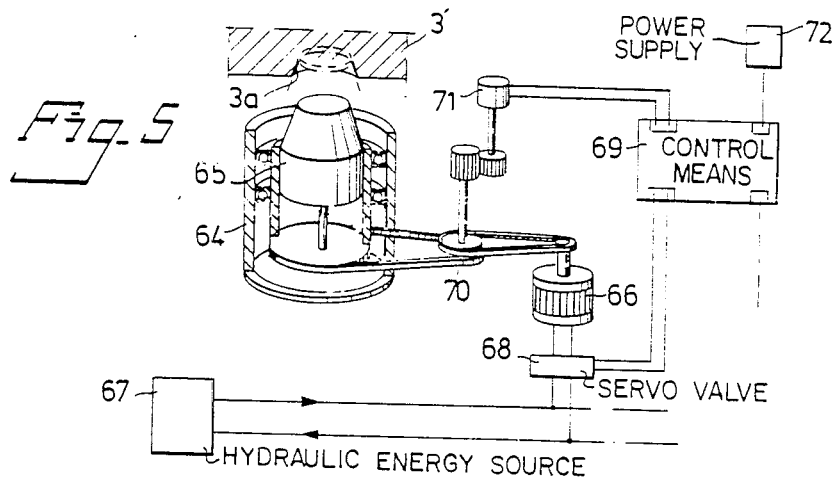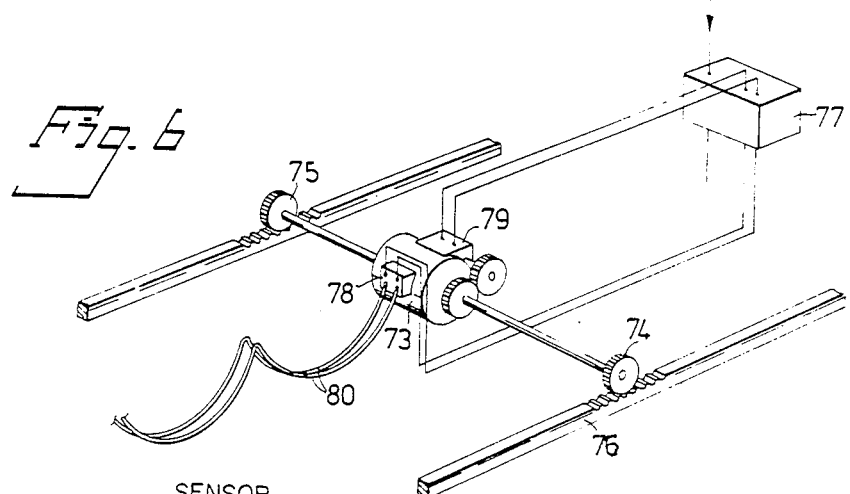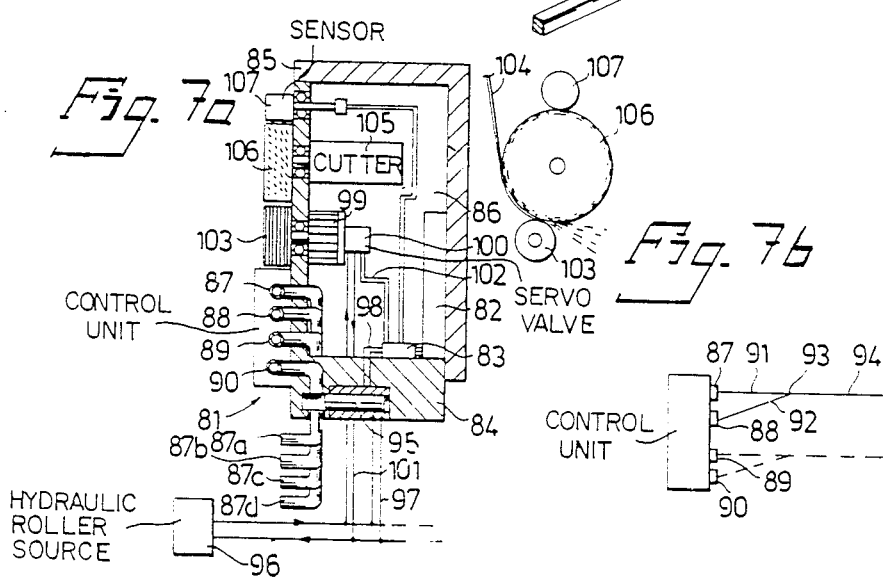

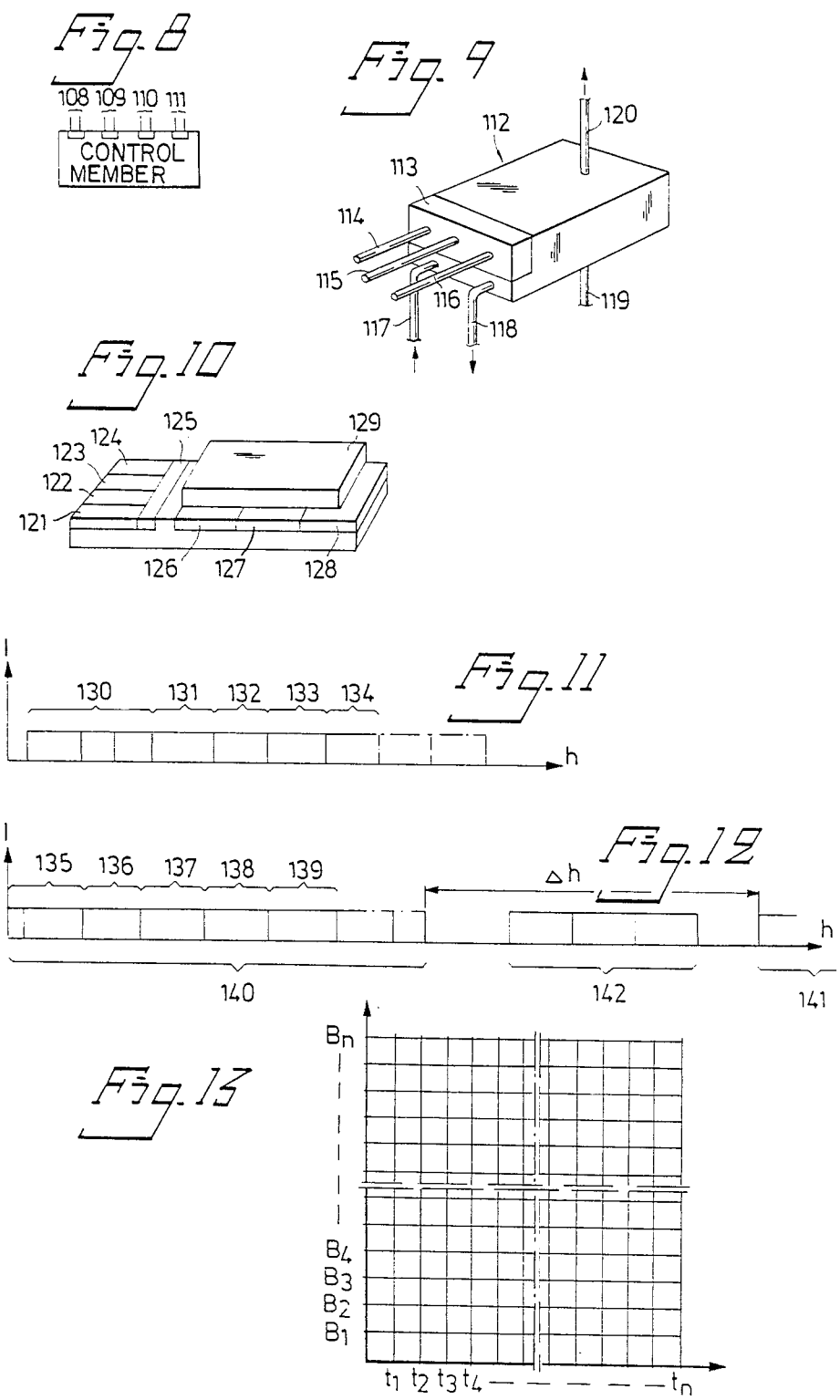

ARRANGEMENT COMPRISING A SYSTEM PROVIDING MOVEMENT, PROCESSING AND/OR PRODUCTION

This application is a continuation, of application Ser. No. 731,626, filed May 1,1985 now abandoned

TECHNICAL FIELD

The present invention relates to an arrangement in the form of a system for the initiation of movements and/or the processing and/or the production of articles or other objects, for example visous or slow-running liquids, paste, etc. The system performs a plurality of co-ordinated functions, with the co-ordination being provided by a computer which is capable of bein program with software compatible with all the functions of the system. the aforementioned functions comprise movements, for example travelling or articulated movements, and/or the actuation of means, for example actions of material-applying and material-supplying and pumps, ste. The nature of the system is also such that the functions themselves and the number and type of the functions may be selected at will at the time when the system is designed and are capable of being modifier, such as increased, after the design stage in connection with the corresponding modification of the compatible software.

DESCRIPTION OF PRIOR ART

The invention does not affect the software on which the system operates. The invention is intended to be used, amongst other things, in the field of education, where the study-related exists to be able to construct different arrangements of an appropriate nature and to use the arrangements thus constructed for the testing and application of various programs.

The invention is also intended for us in the manufacturing industry where there is a need for various multi-function systems which may, for example, extend to one or more industrial robots with different subsidiary functions such as feeding and material supply, etc.

BACKGROUND OF THE INVENTION

TECHICAL PROBLEM

It may be desirable for reasons of study to investigate the performance of everything from component parts to co-ordinated systems for robot equipment and peripheral equipment. Institutions have been obliged to acquire various types and makes of robot equipment fitted with different component assemblies and operable with different softwares, and in so doing severely restricting their opportunities to demonstrate and appreciate the fundamental problems involved. The software was also connected directly to the physical embodiment, which meant that any changes made to it also involved changes to the basic program. Changes of this kind the in prior art are difficult to implement because they call for thorough knowledge of the structure of the system concerned, which in turn demands access to the manufacturer's design base.

Manufacturing industry robot equipment able to perform one type of function, but not another which is to be performed and incorporated into the production line is contained in the prior art. This often leads to the use of interacting items of different kinds of equipment of which are then called upon to utilize standard interfaces, in turn complicating the effective and optimal utiliztion of the equipment as a whole. The more complex integration of the robots means that one will be constrained by the interest shown by the manufacturer in expanding and adding to his software. The result will be a special model, expensive and constituting a source of error, since the level of testing applied to the standard range of products is not possible. It must be remembered in this respect that it is difficult from a purely general point of view to localize programming faults in a special model of the type referred to here by comparison withe the standard product.

It will be appreciated from the above that, from both the educational and the industrial standpoint there exists a singificant need for a computer-based system which will permit several functions of the same and/or different kinds to be performed.

SOLUTION

The present invention has as its principal object the creation of an arrangement which will solve the problems outlined above. accordingly, applicant has invented a design and the basic principle for the arrangement enabling construction which can be tailor-made to the desire number and types of functions and variants. An existing system can, if so desired, be subjected to complementary additions, reductions and/or exchanges of one or more functions.

The invention is characterized essentially by the following features:

(1) At least the majority, and perferably all, the functions are allocated not only a function control member which contains a microprocessor together with the necessary peripheral equipment, but also one or more actuating members and possibly one or more information-providing members. The aforementioned function control member serves one or more function pionts.

(2) At least the majority, and preferably all, the function control members are capable, being mutually interchangeable, of providing the control of a number of functions and/or variants on one or more types of functions. The expression type of function and function variant are used here to denote two different conceptions. The expression type of function is used to denote any different main functions which may be present in the system. Typical examples of such main functions may be a movement function in an articulate joint, an actuating function for a sprayer device, or an actuating function for a pump means. The expression function variant is used to denote any differences in the system, for example, changes in the constants in the function expression for each type of function. Two different articulated joints, for example those in a robot arm, possess an identical main function, although the difference in the dynamic circumstances affecting the two articulations may give rise to different variants of the type of function in question. A second example is that any differences in amplification, in tachometer function, etc., may give rise to different variants. Further examples are provided by the different characteristics of the function of a pump. In certain cases a common algorithm may exist or may be created by two different types of function which are themselves perceived as being physically different, for example articulation - pump. In such cases, the aforementioned types shall be regarded as variants.

(3) At least the majority, and preferably all, the function control members are included in one or more first loops, each of which is connected to the common computer, referred to here as the main computer, which may itself be diveded into equivalent blocks operating in parallel.

(4) A further feature is that the transmission of a signal in each first loop is performed digitally and preferably in series.

(5) The signal transmission involves first signals emanating from a basic program in the main computer which are transmitted during a start-up phase for the system. This transmission contains information for each function control member relating to its setting information for the type of function and/or the variant of the type of function which the function control member is to control at the start-up phase. When the function control member controls only the type of function or the function variant, the function control means is provided with preferably manually adjustable switching means, known as code plug, by means of which the variant or the type of function can be adjusted. In an alternative embodiment both the type of function and the variant can be adjusted by means of the switching means. (6) The signal transmission also includes second signals emanating from a program, here mentioned as a user program (matrix), entered into the main computer. The second signals are transmitted preferably in a cyclical fashion and contain continuous information ralating to the manner in which one or more function and/or variants served by the function control means are to be controlled.

(7) The aforementioned actuating members are supplied with energy via one or more second loops, each of which is connected to a source of energy.

The use of the function control members at or in each of the function points in question means that intelligence can be transmitted in a manner known in the art at or to point in question. Each microprocessor is programmed or porgrammable to execute its loop or control function set by the main computer. Thus, in one embodiment, the control members can receive and, if necessary, porcess and pass on actual-value information from an information-providing device, for example an angle sensor, a thermometer or a power meter, to the computer via the first loop.

The novel system of the present invention is particularly useful in the manufacture of articles, for instance the spraying of plastic objects inside a low-pressure chamber and other spaces where it is desired to create a sequence of movements for a robot optimum in relation to the available space. In one embodiment the robot is equipped for this purpose with a multi-articulated arm which is capable of being operated via an attachment unit in both or either of the X- and Y-axis. The multi-articulated arm supports the material application or material processing devices at its free end, and the movements of said device in the third principal axis, i.e. the Z-axis, ar performed by polar movements of the arm. A manually operated teaching device ('Power Teach') is used to generate a user program and to enter it into the main computer. Full power is present during the teaching phase in the means redundant freedom of motion presented because of the multi-articulated construction of the arm are reduced in a known in the art fashion with the help of the computer.

Regarding a series loop, it is desirable to provide the function control members with information relating to the sequence in which they are positioned in the loops. Each function control member is so arranged as to be capable of being replaced at or in each function stage. At a jack input point, for example, is connected a device which determines the position of the function control member in the loop, each of the devices being connected to the function control member. Each of said determining devices may be applied, either alternatively or additionally, to or in the function control member. The control member be inserted in numerical sequence or in non-numerical sequence seen from the computer. Irrespective of its position, the control member comprises information concerning that portion of a signal series which are intended for that particular portion or signal composition amongst those portions or signal composition which are transmitted from the computer to the function control members of the loop. Any member which is added subsequently will have the highest squence value in the loop, which may even exhibit gaps for function control members which have been removed. This will be collated and arranged by the computer. Information relating to the sequence allocated by the determining device may also be transmitted to the computer.

The equipment may preferably be operated with adjustment phases which are inserted during the operating phase. During the adjustment phase adjustment signals are transmitted between the second signals which any be of a cyclical nature. As an alternative, either all or part of the second signals may be substituted for adjustment signals. The use of the adjustment signal enables functions and/or variants to be replaced during the course of an operating phase, for example a loading function may be followed by an evaluation function. A corresponding can be incorporated into the function control members when the variants and/or types of function controlled by said members are relatively simple, such as the cutting and spraying functions.

In one embodiment the desired set values obtained during the teaching phase with the operating control ('joy-stick') connected are stored in the memory of the main computer. The main computer will arrange the set values of the different function members so as to reduce the number of degrees of freedom and to achieve synchronized movement between the functions controlled by the control members.

In a preferred embodiment the arm is capable of being operated in a frame structure in either or both of the principal axes. The main computer is connected to or comprises a memory of known mass (a 'Winchester'-memory), in which the user program can be entered. Each of the first loops comprises a small number of wires or exhibits a maximum cross-section, preferably of approximately 200 mm$^2$. If, for example, optical wave guides are used, this may provide a large number of internally parallel loops. Seen from the outside, however, a single loop extending to the different function points may be used. The last-mentioned loop may also be regarded as a series loop in this case.

SUMMARY OF THE INVENTION

The present invention allows to create an individual system in a simple fashion from a given set of basic principles, such as robot equipment with interacting subsidiary systems. The basic and operative programs necessary for the main computer and for the various function control members are made and supplied with the system. The system-specific part of the program(s) in the main computer and the specific parts of the program(s) for the functions (the function control members) can be produced in-house by a user who has purchased or who is using the basic system. This results in the creation of a basic configuration which can be expanded by means of programs relating to the manner in which the various parts of the system are to interact. It is also possible, for example, to construct an item of robot equipment with different subsidiary systems and use the same software. The proposed system is easy to learn, apply and understand. Changes are easy to make at a later date. The components themselves (functions and variants) can be increased or reduced in number or replaced. When the function control members are individually exchangeable, a type of function and/or a variant may be added by introducing a further function control member. If the number of types of function or variants is to be reduced, then the card is removed or disconnected from the first loop. If the function type or variant is to be changed, then a change is made to the actual lines of the matrix concerned, enabling other parts of the program to be used. In this way any software already present in the function control means can, as a general rule, be retained unchanged at the same time as only minor adjustments need be made to the user program.

The main computer is able to send information to the function control members relating to the type of function, the variant, and maximum and minimum variations in the values. The computer is also able to receive information from each control member, such as relating to the set position and error messages. Adjustment or replacement of the parameters is possible while the equipment is running. The main computer can check whether or not commands which have been given have been implememted, for example, by eye-checking the status of the servo controlled by the control member.

It is also possible to design the wiring so as to exhibit a small external cross-section, which is of major technical and economic significance, especially in restricted spaces. A function control member can then be removed or added without the need to modify the wiring. In the case of robot equipment used inside low-pressure chambers, possibilities are then opened to make the chamber itself in the form of modular units, and in so doing, enabling its size to be optimized to suit the one or more articles which are to be processed or manufactured inside the chamber. The ease with which the software can be modified allows the chamber to be constructed in accordance with a modular system, thereby permitting to be explanded. Programs written for a first size of chamber can also be used with minor modifications for chambers of a different size.

The system also offers advantages from a financial and stocking point of view, since only one type of card (function control member) need be kept availalbe. Fault-tracing is also made easier if the fault can be loctated simply by changing cards at the point or points concerned.

BRIEF DESCRIPTION OF THE DRAWINGS

A proposed embodiment of an arrangement which exhibits the significant characteristic features of the invention is described below with reference to the accompanying drawings, in which:

FIG. 2 shows an alternative embodiment for component parts of the system in accordance with FIG. 1;

FIG. 3 shows in basic diagrammatic form the functional connection of the component parts of the system in accordance with FIG. 1;

FIG. 4 shows examples of a first type of function included in the system in accordance with FIG. 1;

FIG. 5 shows examples of a second type of function included in the system in accordance with FIG. 1;

FIG. 6 shows examples of a third type of function included in the system in accordance with FIG. 1;

FIG. 7a and 7b show various views of examples of a fourth function included in the system in accordance with FIG. 1, and also illustrate examples of the installation of a card bearing the microprocessor for the system with its associated peripheral equipment, i.e. the functional control member;

FIG. 8 shows in diagrammatic form the connections for the function control member in accordance with FIG. 7a;

FIG. 9 shows a unit consisting of a card with a microprocessor and its associated peripheral equipment (=function control member) and illustrates the connections for the signal control of the card, power control and material flow;

FIG. 10 shows examples of the principal structure of a function control member;

FIG. 11 shows a diagram of the first signal to be transmitted in a first wiring loop connecting together the function control members in the system;

FIG. 12 shows in diagrammatic form second signals in the aforementioned loop;

FIG. 13 shows in diagrammatic form general co-ordinates entered into a matrix.

DESCRIPTION OF A PREFERRED EMBODIMENT

Figure 1:
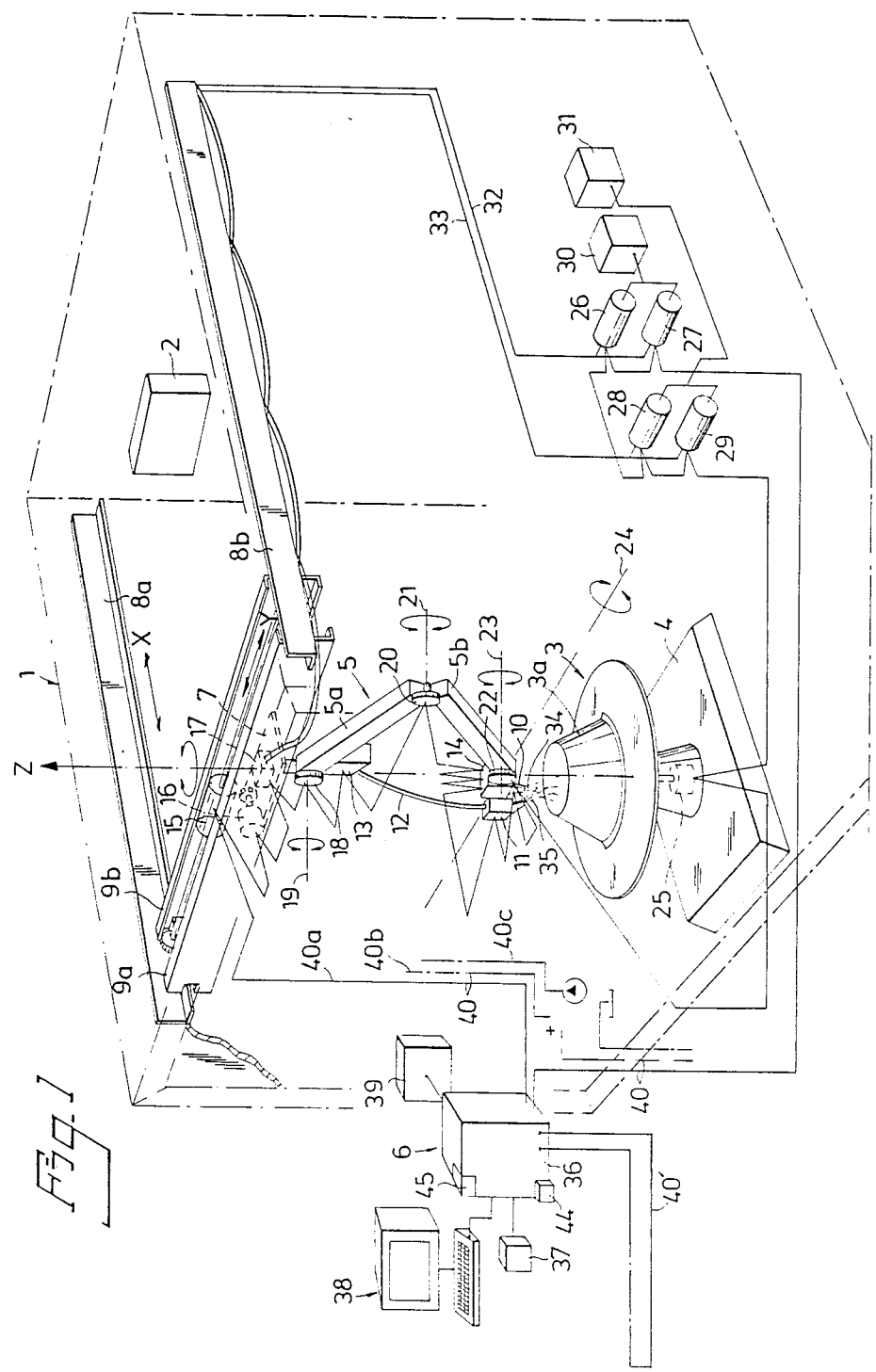
FIG. 1 shows in perspective view the principal structure of a system based on the invention comprising a low-pressure chamber and equipment for the manufacture and/or the processing of plastic articles.

FIG. 1 illustrates a low-pressure chamber system which can be of a type known in the art and is indicated by the reference 1. The low-pressure chamber is equipped with low pressure-generating means identified by reference 2. The chamber is provided with one or more openable and closable doors, and one or more objects of articles 3 can be introduced into the chamber at atmospheric pressure and manufactured or processed at low pressure in side the chamber once its doors have been closed and the air avacuation equipment has been actuated. The articles 3 consist in this case of mould, with the help of which a product 3a in manufactured. The mould 3 is placed on a stand 4, in relation to which the mould is movable, for example, rotated and/or displaced.

The system also includes robot equipment 5, 6 comprising a multi-articulated arm 5 and a main computer 6. This arm is attached in an articulated fashion at one of its ends to an attachment unit 7. The arm is supported via attachment unit in a frame structure arranged inside a low-pressure chamber and comprising two longitudinal members 8a, 8b and two transverse members 9a, 9b. The attachment unit is capable of longitudinal displacement in the transverse members, which in turn are capable of movement in the longitudinal direction of the longitudinal members. Two linear principal movements X and Y can thus be effected by the arm 5. It is also possible for the are to be manable in only one of principal directions X and Y.

At its free end the multi-articulated arm supports material application means 10, 11 which can incorporate a spray pistol 10 and a cutter head 11. The material feed to cutter 11 is indicated by the reference 12, and a magazine 13 for the material 12 is connected to or secured to an articulation 5a in the multi-articulated arm 5. The third principal direction Z for means 10, 11 is effected in the multi-articulated arm with the help of polar movements in the arm, the polar movements being achieved by means of rotations of the articulations for the sections 5a, 5b of the arm and the articulation between the section 5b of the arm and means 14 which supports said means 10, 11. In the embodiment illustrated here, the attachments of the multi-articulated arm to the attachment unit 7 and the means 10, 11 are located at all times essentially in the third principal direction Z, which provides adavantageous torque loadings and flexural stresses in the various section of the arm 5.

The arm 5 is able to perform the following movements. The two linear movements X and Y are performed with help of driving means 15 and 16. The arm is also able to rotate about the X-axis with the help of a rotating means 17. The upper articulation 18 is able to move about a shaft 19. This movement can be produced with rotating means of a type known in the art and arranged in the articulation 18. A rotating motion about the shaft 21 takes place at the central articulation 20. A rotating motion about the shaft 23 takes place at a lower articulation 22. Furthermore, the means 14 is able to effect three polar motions relative to the section 5b of the arm. One of these polar motions is the motion about the shaft 24. The other two polar motions take place in two planes which are perpendicular to each other and which include said shaft 24. The rotating movement of the mould 3 is performed by a rotating means 25, and the rotation takes place in the present case essentially about the Z-axis. The possible lingitudinal displacement of the mould 3 and the stand 4 is not shown.

The rotating movements in the different articulations of the arm are able to take place in a similar fashion to that indicated for the articulation 18 in the above.

Preferably all of the linear and polar movements in accordance with the above is each provided with its own microprocessor with the associated peripheral equipment necessary for its function, which together form a function control member and are arranged, on a common card. The movements in the articulations of the arm constitute one type of function, while the different articulations are related to different variants, depending on any differences in the dynamics, in the degree of amplification and in the speed of ratation.

The system also includes a type of function in the form of material supply devices, for example in the form of pumps 26, 27 and 28, 29 which operate in pairs. One of he pairs of pumps 26, 27 pumps material of a first kind, such as a plastics material in the form of polyester from a container 30 to the material application means 10 which may be in the form of a spray pistol. The other pair of pump 28, 29 pumps in a similar fashion a hardener, such as peroxide, from a container 31 to said spray 10. The material is fed via separate lines 32, 33 which lead in a manner known in the art from the pumps, preferably situated on the outside of the chamber, via openings in the wall of the chamber to the spray pistol whith the supply of the material in the arm 5 being provided inside said arm in a way known in the art. The polyester and the hardener are mixed inside or outside the spray pistol, and the jet from the latter is indicated by the reference 34. In the event of reinforcement being required, the cutter head 11 is activated, and the reinforcement material from the cutter is indicated by the reference 35.

Each of the supply means 26, 27 and 28, 29 is allocated its own function control member the, the same as each of the material application means 10, 11. If other means are present in the co-ordinated movement system, then each of these other members is similarly provided with preferably its own function control member.

The main computer equipment incorporates in the typical embodiment specified here a main computer 36 which is connected to or which contains a mass storage device 37. Also connected to the computer is a terminal 38 with writing and reading means. Teaching equipment in the form of the so-called 'Power Teach'is indicated by the reference 39. The use of the equipment 39 means that it is possible, with the use of a handle (not shown) on the robot or at a certain distance from it, to generate a force in the direction in which it is wished to cause the material application means to move and rotate. The desired direction is processed by the computer, which will generate generalized set values for each of the function control means with any redundant degrees of freedom being fixed in a manner previously determined by the manufacturer of the system.

An essential characteristic feature of the system is that the function control members for the different movements and means (devices) are connected in or to a first wiring loop in which the function control members are connected in series. The function control members can thus be connected to each other in parallel with the wiring loop in such a way that the reception and generation of signals by each of the function control members will be independent of the other function control members, inasmuch as the processing in a function control member will not require delay by the processing in other function control members. Pure series connection may be used as an alternative. The wiring loop comprises, in addition to an electrically conductive wire or wires 40a for the connection of the function control members, an elecrtically conductive wires 40b for the energy supply to the microprocessors. In a second loop are arranged wires or conductors 40c for the force-exerting or force-generating means which are present at each function point, i.e. movement- or function-providing point. The supply of power via the wires of the conductors 40c can take place by hydraulic and/or electrical means. The transmission of the signals for the control or controls for the microprocessors at the different function points is performed digitally and in series form. Currently available technology has the effect of limiting the number of functions which can be connected to the first wiring loop. The invention thus also incorporates the idea that the movements and the means at the different function points can be divided up into a number of first wiring loops, with an additional first loop of this kind being indicated in FIG. 1 by the reference 40'. It is possible, in accordance with FIG. 2, to divide up the power supply into two or more second loops 40c', 40c'', in spite of the fact that the movements and/or means 41, 42, 43, etc., are served by the same control conductor 40a'in the first loop. This may be desirable if there are present movements and/or organs in the system which demand a particularly high level of power. FIG. 2 also illustrates the principle by which the different function control members are controlled in the common loop 40a' from the main computer 36', at the same time as each of the function control members perform its own loop or function, these being indicated by 41a, 42a and 43a. The main computer determines by its program the manner in which the function control members are to be co-ordinated and, if appropriate, the roles which they are to be allocate within the system. The function control members determine be their programs the manner in which the function is to be executed in detail. The voltage supply for the function control members is not shown in FIG. 2. The number of electrical wires may be as low as two in the case of the more simple systems. The present examples uses 5-6 wires, with preferably not more than 8-12 wires being included in the loop. The external cross-sectional area of each wire is not more than 300 mm$^2$, and preferably not more than 200 mm$^2$.

The system operates with programs at different levels. In addition to the aforementioned user program there is an operative or basic program which comprises, among other things, programs for the operation of the system, communication, and contains concepts and tables for the set values, rules, parameters, addressing, read-out and print-out functions.

Also included are the principles according to which the system is to operate for different commands, and according to which the function control members are to interact with the main computer via the wiring loop, ect. The aforemantioned set values are entered into the Winchester memory 37 and are transferred from there into the working memory of the main computer (CPU). The sequence in which the desired values are read is determined, for example, by the operative system. The operative program must, in principle, belong to the system and must accompany the system in the event of a system of this kind being sold. In FIG. 1 the memory in the main computer 36 for the operative program are indicated by the references 44 and 45.

FIG. 3 is intended to illustrate an example in which the power supply is provided in a hydraulic fashion from a hydraulic energy source 46. To the two hydraulic lines, the feed and return lines, is connected a servo valve 47, 48 and 49 wiht the associated servomotors 50, 51 and 52 for each of the function control members 41', 42' and 43'. To the output shaft 50a, 51a and 52a of each of the motors is connected an information-providing means 53, 54 and 55, such as an angle sensor, each of which is connected to its associated function control member. The function control members are also connected to their own servo valves 47, 48 and 49. A voltage source for the supply of each microprocessor with its associated peripheral equipment is indicated by the reference 56. Set-value information is transmitted in the first wiring loop 40'' from the computer. The control of each motor is achieved with the help of this set-value information, and information is obtained via the sensors 53, 54 and 55 from the function which has been effected, i.e., the actual (true) value, which is then returned to the main computer via the microprocessors. The actual-value information can be utilized in order to stop a running process if the means concerned are not preforming the actual functions in the intended manner.

FIG. 4 shows the nature of the connection of the microprocessor and its peripheral equipment to a type of function in the form of a pump means such as pump means 26, 27 and 28, 29 in FIG. 1. A cylinder with its associated piston is identified by the reference 57. Means 58 controlled by a check valve is caused via the piston rod of the pump, to pump material, for example from the container 30 into the line 32. Instead of a servo valve, use is made of a so-called proportional valve 59 of a previously disclosed type. The control member 60 controls said valve 59 and the valve is supplied with power from the source of hydraulic power 61. The source of the voltage supply for the control member is indicated by the reference 62, and the control member receives actual-value information via the sensor 63 which monitors the position of the piston rod i, the pump cylinder.

FIG. 5 shows a second type of function, this being the function for the rotation of the mould 3'. A unit 64 includes in this case a component 65 which, by being caused to rotate, will at the same time describe a longitudinal displacement movement. With the unit in its non-activated position the component 65 is disconnected from the mould 3'. When the unit 64 is activated the component 65 will be displaced in a longitudinal sense and will pass via an opening 3a into engagement with the mould table and will then be able, with the help of friction, to cause the mould table to rotate. The component 65 is driven by a hydraulic motor 66 which is supplied with energy from a source 67 and is controlled via a servo valve 68, the control input for which is connected to the control means 69. The motor 66 drives the unit 64 via a gear 70 on which is arranged an angle sensing means 71. The control member is connected to the information sensor 71 and receives its power supply from the source 72. FIG. 6 shows means for executing the linear X- or Y-movements in accordance with FIG. 1. A motor 73 is equipped with two output shafts, each of which exhibits at its ends toothed wheels 74 and 75, by means of which a drive is provided along toothed rails 76. The function control means 77 controls the motor via the servo valve 78. A sensor 79 for the angle of rotation is connected to one of the output shafts of the motor 73 and is connected to the control member. Hydraulic lines for the supply of energy are identified by the reference 80.

FIG. 7a and 7b illustrate examples of how two different functions can be combined together in a unit 81 and examples of how a card with a microprocessor and the associated peripheral equipment can be designed to be accommodated in a function point. Preferably the entire control member shall be removable and replaceable by a card of equivalent function and construction. The card is best arranged for this purpose so as to be capable of jack connection to a contact device 83, with the card being executed with male or female jack connections and the contact device with corresponding female or male jack connections. In the present case, the cutter head and the spray pistol functions are served by the same control member or card 82. The unit 81 comprises a frame component 84 with the associated extensions 85. The card 82 and the contact device are arranged for this purpose inside the volume 86 of the unit. On the frame 84 are mounted a number of jets 87, 88, 89 and 90. The number in this case is four, and must be used in pairs. Each jet is connected to a channel 87a, 87b, 87c and 87d, via which the plastic material, the polyester and the hardener, are fed. In FIG. 7b the jet of polyester issuing from the activated pair of jets 87, 88 is indicated by the reference 91. The corresponding jet of hardener is indicated by the reference 92, and the mixing together of the polyester and the hardener takes place outside the spray pistol approximately at the point 93, whereupon the mixed material containing the hardener, indicated by the reference 94, is able to reach the mould shown in FIG. 1. A broken line is used in FIG. 7b to illustrate the corresponding function for the pair of jets 89, 90 when these are activated. Each of the channels 87a-87d is equipped with a shut-off valve, of which the shut-off valve 95 for only one of the channels 87a is shown in FIG. 7a. The valve 95 consists of a valve which is controlled by a signal from the control member 82 and is supplied with power from a hydraulic source 96. With the valve in its non-activated position the channel 87a is closed, whereas with the valve in its activated position (=the position shown in FIG. 7a) the channel remains open. The supply from the hydraulic system arrives via the line 97, while the control from the control member is provided via the line 98.

The cutter is driven by the motor 99 which is equipped with a servo valve 100 and is supplied with power from the energy source 96 via lines 101 and is controlled from the function control member via lines 102. The motor is supported on the frame 84 and is situated inside the space 86. On the outside of the unit 81 are connected to the motor a driving means 103 for the cutter and the stranded reinforcement material 104, which is cut in the cutter and is mixed with the jet 94 or is the jet 94 or mixed with the material on the mould 3. The cutter is indicated by the reference 105 and is similarly supported on a wall of the unit 81. The cutter wheel is identified by the reference 106 and interacts with the wheel 103 of the cutter motor in a known in the art fashion. A sensor 107 for the angle of rotation is connected to the cutter wheel and has its control signal output connected to the control means. All the connections to the member are in this case executed via the contact device 83.

The control member is in this case executed with a servo output 108, an impulse input 109 from the information transmitter and two on/off output for the control of the valves 95 in pairs.

FIG. 9 shows a unit 112 which is capable of being applied to each function point. The unit constitutes a complete unit which can be arranged at a suitable point in the desired application. The unit incorporates the exchangeable card 113 with a microprocessor and the nessary peripheral equipment. The unit is provided with an input for the cores 114 and 115 of the wiring loop. The power supply to the control member is identified by the reference 116. The unit also contains connections 117 and 118 for the supply of power to each of the function points included in the loop. The lines may be hydraulic or elastic. The unit can also be provided with lines 119 and 120 for the material which may have to be controlled at the point inquestion. The last-mentioned lines may be omitted function points with a purely movement-providing function.

FIG. 10 illustrates the principle of the functional structure of a card with the associated microprocessor and peripheral equipment which, among other things, incluldes different memory areas. In principle, each card must be able, for a particular type of function or variant, to perform the control of one type of function of one function variant at a time, the type or varient being selected from among a number of possible types and/or variants for which the card has been produced. In the case of the more simple types or variants (on/off), one and the same function control member can be used to control more than one variant and/or type of function simultanously. The Figure illustrates four particular types and/or variants, identified in principle by the references 121, 122, 123 and 124. The number of types of function and function variants may range from one type or one variant upwards. The total number of types and/or variants should be several in number, and preferably three or more. The higher the number, the greater will be the advantages for the system provided by the present invention. The actual type/variant from among the possible types/variants is selected on the basis of the control signals emitted by the main computer, and a selection means or selection program for identifying the actual type-variant is indicated by the reference 125. The arrangement in accordance with FIG. 10 may alternatively be provided with preferably manually adjustable switching devices known as DIP switches, which thus correspond to the means 125. These are used to set the types and/or the variant of the function, while the variant or type can be set by means of signals from the main computer. The switches can also be arranged for manual switching or burning, In an alternative embodiment both the type and the variant are set by means of the switching device. In FIG. 10 the reference 126 is a component which ensures communication with the first wiring loop, 127 are the memory spaces, 128 is the necessary software, and 129 is the program memory utilized by the user. The programming to be entered into the various control means will depend on the function controls which the control members are specifically required to be capable of controlling. In the present case equivalences shall exist in the control member with the basic, operative and user programs referred to above. The operative program is based on the characteristic features which are required to exist with regard to the communication between the main computer and the control members. The operative system may also be programmed on the basis of the type of senor output, and on the basis of the manner in which the input signals are to be processed. The details can be entered into a first memory, while in a second memory which may be situated for this purpose either in the function control members or in such a way that it is capable of being connected to it such as the memory 129, are entered details relating to working principles, the different function categories which are to apply to the card and the servomotors. Specific characteristic features for the operative program for the system may also be entered into the memory of the microprocessor.

In a preferred embodiment the structure of the program may be divided into three levels, with the operative program, above constituting a first level, a custoner-related program constituting a second level, and a pre-recorded or user program constituting a third level. The supplier of the system supplies the operative system, while the second level provides the purchaser with the opportunity to integrate the system into his own particular surroundings. The customer may conceivably wish to connect the system to his own financial or customer functions. The boundary between the first and the second levels will, of course, depend on the competence of the purchaser.

FIG. 11 and 12 illustrate examples of the signal transmission, i.e., the transmission of the control signal, which is to take place from the main computer to the different control members. The system will then opoerate in at least two different phases, of which one is referred to here as the start-up phase and the other as the operating phase. A third phase, the adjustment phase, may also occur. During the start-up phase, which is based on the basic program of the main computer, first signals are initiated in accordance with FIG. 11. The signals are preferably digital and take place in series form or serially for the purpose of achieving a connection with a small number of wires in the wiring loop. The signals are constructed in accordance with current International Standard RS 232 and include synchronization, coding and control bits followed by the information components 131, 132, 133 and 134, each of which is specific to each of the different control members. The information components contain, information which identifies the existing type of function and/or function variant with which the control members are to operate during the operating phase. During the operating phase continuous set-value information or corresponding information is transmitted to the various control members. The first signals can be replaced in one embodiment with the switching device or code jack referred to above. It is, in fact, possible to cause the first signals to bring about the entry of function-specific programs into the control members, which for this purpose are equipped with corresponding memory or memories.

The second signals in accordance with FIG. 12 are transmitted during the operating phase and contain synchronization, coding and control components 135 in accordance with the first signals. Also included are information components 136, 137 which are specific to the different control members, each of which is thus allocated its own component within the signal sequence. Each second signal thus also contains individual second periods 138, 139, ect., each of which is specific to each of the different control members. In these second periods the control members are able to enter actual-value information or some other information which is to be transmitted to the main computer. The second signals are transmitted perferably in a cyclical manner, and FIG. 12 illustrates two sequences of signals identified by the references 140 and 141, said sequences of signals occuring at intervals of h. The first and second signals are transmitted in sequences of 16 bits.

During each adjustment phase, which can occur temporarily or continuously during the operating phase, adjustment signals 142 are transmitted, for example for the period h between the cyclical second signals 140 and 141. Each adjustment signal can replace a part of one or several second signals, and the adjustment signal emantes from fixed or adjustable programs in the main computer and can, for instance, be initiated by the operator. The dividing up of an actual program component into adjustment signals and the reception of the adjustment signals in the function control member concerned takes place by means of familiar SIO circuits. The adjustment signals can be used to modify one or more functions and/or function control members either temporarily or continuously. On example is an occasion when it is desired during operation to obtain an indication, such as position of the member.

The transmission of the signal effected from the main computer takes place in a known in the art fashion by means of so-called SIO circuit depending on the programmed control in the main computer. The reception of the signal and the transmission of the signal for each microprocessor also takes place in a manner known in the art. As far as the information-providing means are concerned, these should preferably be in the form of impulse-providing means.

The chamber 1 in accordance with FIG. 1 can, if so desired, be designed as a modular system which can be adapted to suit the one or more articles which are to be manufactured in the system in question.

FIG. 13 shows a matrix for the entry of set-value information at different times in the Winchester memory 37. The set values are arranged in rows B1, B1 . . . Bn. the x-axis of the matrix indicates the times $1_t$, $t_2, t_3$ . . . $t_n$ for the entry of the set values. The distance between the times is identical and is selected to be sufficiently short for it to be less than the error signal of each corresponding device, for example the servomotor 50 in FIG. 3.

The CPU fetches different program parts from the mass storage device 37, these parts initially being applied in chronological order. Any changes to the program or parts thereof are entered as they arise at the end of the area of the mass storage device, which may mean that the CPU must read the composite program from various parts of the memory. The assembly of the programs themselves and different programs are processed by the computer in such a way that the interchange between the programs and their component parts are not noticable to the process.

Figure 14:
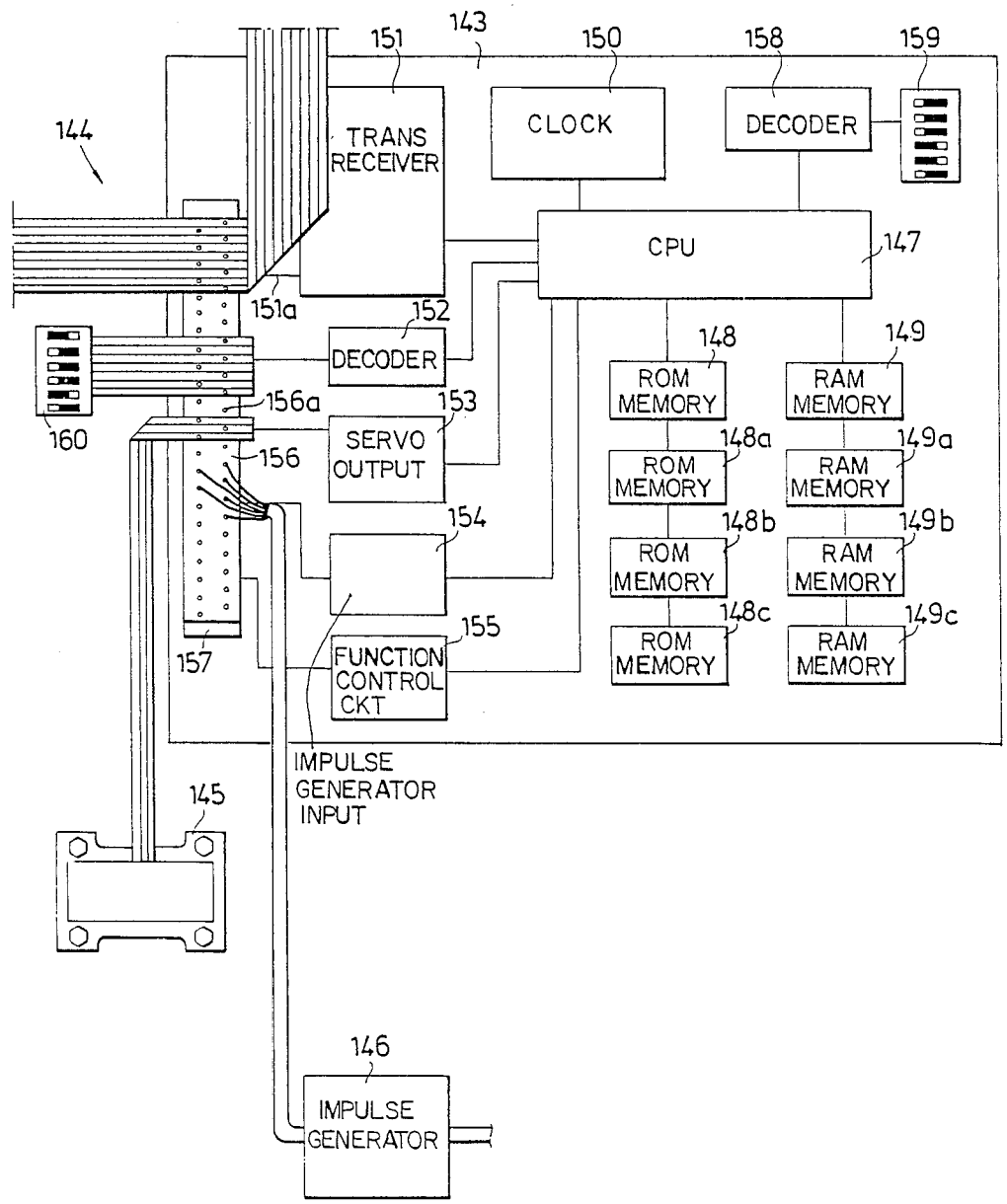
FIG. 14 shows in the form of a block diagram a structural design of a function control member.

The reference 143 in FIG. 14 denotes a card or a function control member which is capable of being connected at a physical position on the actual means. The first wiring loop is identified by the reference 144 and consists of a flat cable with conductors inside. The card is connected to an actuating means, the servo valve 145, and to an impulse generator 146. The connections are made via conductors.

The card has a CPU 147 and connected to it ROM memories 148, 148a, 148b and 148c and RAM memories 149, 149a, 149b and 149c. The ROM memories constitute fixed programs, and the RAM memories are loaded at the start-up phase from the main computer. The last-mentioned memories also serve as working memories. The CPU is connected to a clock 150, to a transmit-receive circuit 151, to a decoder 152, to a servo output 153 for connection to the unit 145, and to an impulse generator input 154 for the connection of the generator organ 146. Also connected to the CPU is a circuit 155 for the other control functions, that is to say one or more control functions of a type similar to or different from said means 145. Other function(s) and/or variant(s) may thus be controlled by the card 143.

The card is provided with a printed circuit 151a for the connection of said circuits. The connection of the wiring loop 144 and of the means 145 and 146 is effected via a contact organ which consists of a female contact component 156 and a male contact component 157. From the upper side of the female contact component projects a contact pin 156a, via which contact and connection of the wiring loop 144 and the means 145 and 146 is effected.

The invention also proposes a simple method of identifying the position or sequence of each function control member in the wiring loop so that, when a signal is transmitted in it, the correct signal or part of a signal will reach each control member. Each control member is provided in the typical embodiment with a code jack (plug) or switching means which determines the sequence of the control devices in the loop depending on an adjustment, e.g. a manual adjustment. The code jack can be situated on the card and connected via a decoder 158 to the CPU and allocated the reference 159. Alternatively or additionally, a further code jack 160 may be connected via the contact means 156, 157. The connection is made in the same way as for the loop 144 and the means 145. Either or both of the code jacks may also be utilized for the adjustment of the type of function and/or the variant thereof.

The invention is not restricted to the embodiment illustrated above by way of example, but may undergo modifications within the context of the following Patent Claims and the conception of invention.

I claim:

1. A distributed control system for performing functions at a plurality of physically separated function points, conprising:
   (a) at each function point:
      (i) actuating means for carrying out a specific function; and
      (ii) function control means for controlling said actuating means, said function control means including a programmable microprocessor having an associated memory and interface, said microprocessor being configurable to provide a selected control function for controlling one of a plurality of different types of actuating means;
   (b) at least one of said function points comprising:
      (i) a sensor connected to said actuating means and to an input of said function control means, and forming a continuous feedback loop;
   (c) a common computer connected to the function control means of each function point through a first common connection loop, said computer comprising:
      (i) means for transmitting, during a start up phase, a first set of digital signals for configuring the function control means of each function point to provide a selected control function; and
      (ii) means for transmitting to the function control means of each function point, during an operating phase, a second set of digital signals comprising operating commands for the specific function to be carried out by the actuating means controlled by said function control means; and
   (d) means for supplying energy to said actuating means through a second common connection loop.

2. The system of claim 1, wherein at least one function point comprises:
   means for providing information to the associated function control means, and the associated function control means comprises means for continuously transmitting said information to said common computor under the control of said second digital signals.

3. The system of claim 2, wherein said means for providing information provides information in the form of electrical impulses.

4. The system of claim 1 or 2, wherein the common computer comprises means for providing, during the operating phase, at least one switching phase comprising digital signals for configuring the function control means of at least one function point to provide a new control function.

5. The system of claim 1, wherein the functions of the system comprise at least the function of an industrial robot with a multi-articulated arm which performs a large number of linear and polar movement and having on a free end a means for the processing of articles.

6. The system of claim 5, wherein the system includes a low pressure chamber containing said robot; at least one means for supplying a material; and said arm comprising at least one means for applying said material.

7. The system of claims 5 or 6, wherein the robot is coordinated in the system with a sparately positioned one of said actuating means comprising at least one pump for the supply of working material of an industrial process.

8. The system of claims 5 of 6, wherein the system includes manually operated program teaching means for permitting the use of the common computer for the reduction of redundant degrees of freedom in the movements of the articulated arm.

9. The system of claim 1, wherein the function control means of each function point comprises means for determining the sequence of the function control means in said first common connection loop.

10. The system of claim 1, wherein the number of wires in said first common connection loop is less than twelve, or said first common connection loop comprises wires having a cross-sectional area of less than approximately three hundred square millimeters.

11. The system of claim 1, wherein the function control means connected to said first common connection loop

* * * * *